United States Patent [19]
Haney et al.

[11] Patent Number: 5,467,211
[45] Date of Patent: Nov. 14, 1995

[54] OPTOELECTRIC SLIDING BANYAN NETWORK

[75] Inventors: Michael W. Haney, Herndon; Marc P. Christensen, Ashburn, both of Va.

[73] Assignee: Capital Photonics, Inc., Washington, D.C.

[21] Appl. No.: 378,015

[22] Filed: Jan. 25, 1995

[51] Int. Cl.⁶ .................................................. H04J 14/00
[52] U.S. Cl. ........................... 359/117; 359/139; 359/109
[58] Field of Search ................................ 359/109, 117, 359/128, 139, 163; 385/16–17; 364/713; 370/58.1, 60, 85.2

[56] References Cited

U.S. PATENT DOCUMENTS 5,289,303  2/1994  Cloonan et al. ........................ 359/109

OTHER PUBLICATIONS

Tobagi et al. "Architecture, Performance, and Implementation of the Tandem Banyan Fast Packet Switch" IEEE Journal on Selected Areas in Communications vol. 9, No. 8, Oct. 1991. pp. 1173–1193.

T. J. Cloonan; Comparative Study of Optical and Electronic Interconnection Technologies for Large Asynchronous Transfer Mode Packet Switching Applications; Optical Engineering, vol. 33, No. 5 (1994); pp. 1512–1523.

T. J. Cloonan et al.; The Chuted–Banyan (Canyan) Network: An Efficient Distribution Network for Growable Packet Switching Based on Free–Space Digital Optics; Int'l Conf. on Parallel Processing (1993); pp. I–146–149.

M. W. Haney; Pipelined Optoelectronic Free–Space Permutation Network; Optics Letters, vol. 17, No. 4 (1992); pp. 282–284.

M. W. Haney et al.; Free–Space Optical Sliding Banyan Network; OSA Topical Meeting: Photonics in Switching, (1995).

F. B. McCormick et al.; Six–Stage Digital Free–Space Optical Switching Network Using Symmetric Self–Electro–Optic–Effect Devices; Applied Optics, vol. 32, No. 26 (1993); pp. 5153–5171.

H. S. Stone; Parallel Processing With the Perfect Shuffle; IEEE Transaction On Computers, vol. C–20, No. 2 (1971); pp. 153–161.

T. J. Cloonan et al.; Free–Space Photonic Switching Architectures Based on Extended Generalized Shuffle Networks; Applied Optics, vol. 31, No. 35, (1992); pp. 7471–7492.

M. Hibbs–Brenner et al.; Design, Fabrication and Performance of an Integrated Optoelectronic Cellular Array; SPIE Proceedings of Optical Enhancements to Computer Technology (1991); pp. 1–11.

M. Decina et al.; Shuffleout Architectures for ATM Switching; ISS, vol. 2, (1992).

F. Kiamilev et al.; Optically Interconnected MCMs for Gigabit ATM Switches; Optoelectronic Interconnections (1993), SPIE, vol. 1849; pp. 160–171.

F. Kiamilev et al.; Modular Architecture for Smart Pixel Switching Networks; Optoelectronic Interconnects (1993), SPIE, vol. 1849; pp. 129–140.

C. P. Kruskal et al.; The Performance of Multistage Interconnection Networks for Multiprocessors; IEEE Tranactions on Computers, vol. C–32, No. 12 (1983); pp. 1091–1098.

(List continued on next page.)

*Primary Examiner*—Leo H. Boudreau
*Assistant Examiner*—Kinfe-Michael Negash
*Attorney, Agent, or Firm*—Finnegan, Henderson, Farabow, Garrett & Dunner

[57] ABSTRACT

A sliding banyan switching network is disclosed for signal switching in an electrical or an optical network. The sliding banyan network routes up to N signals through a plurality of stages, each containing a plurality of switches. The sliding banyan network determines when a signal reaches its destination address by keeping track of the number of successful consecutive routings through the stages of the network. When this number reaches a predetermined number, the signal has reached its destination. The nodes of each stage are formed on a single substrate and the interconnections are implemented by optical connections. Only a single input line and a single output line for each set of nodes connects the sliding banyan network to the external system.

23 Claims, 11 Drawing Sheets

SLIDING TANDEM BANYANS

OTHER PUBLICATIONS

M. Kumar et al.; Performance of Unbuffered Shuffle–Exchange Networks; IEEE Transactions on Computers, vol. C–35, No. 6 (1986); pp. 573–578.

M. W. Haney; The Application of Self–Similar Patterns to Opto–Electronic Shuffle/Exchange Network Design; Optical Computing Topical Mtg., (1993).

M. W. Haney; Self–Similar Grid Patterns in Free–Space Shuffle/Exchange Networks; Optics Letters (1993).

Product Description; LattisCell; SynOptics Communications, Inc. (1994); pp. 1–16.

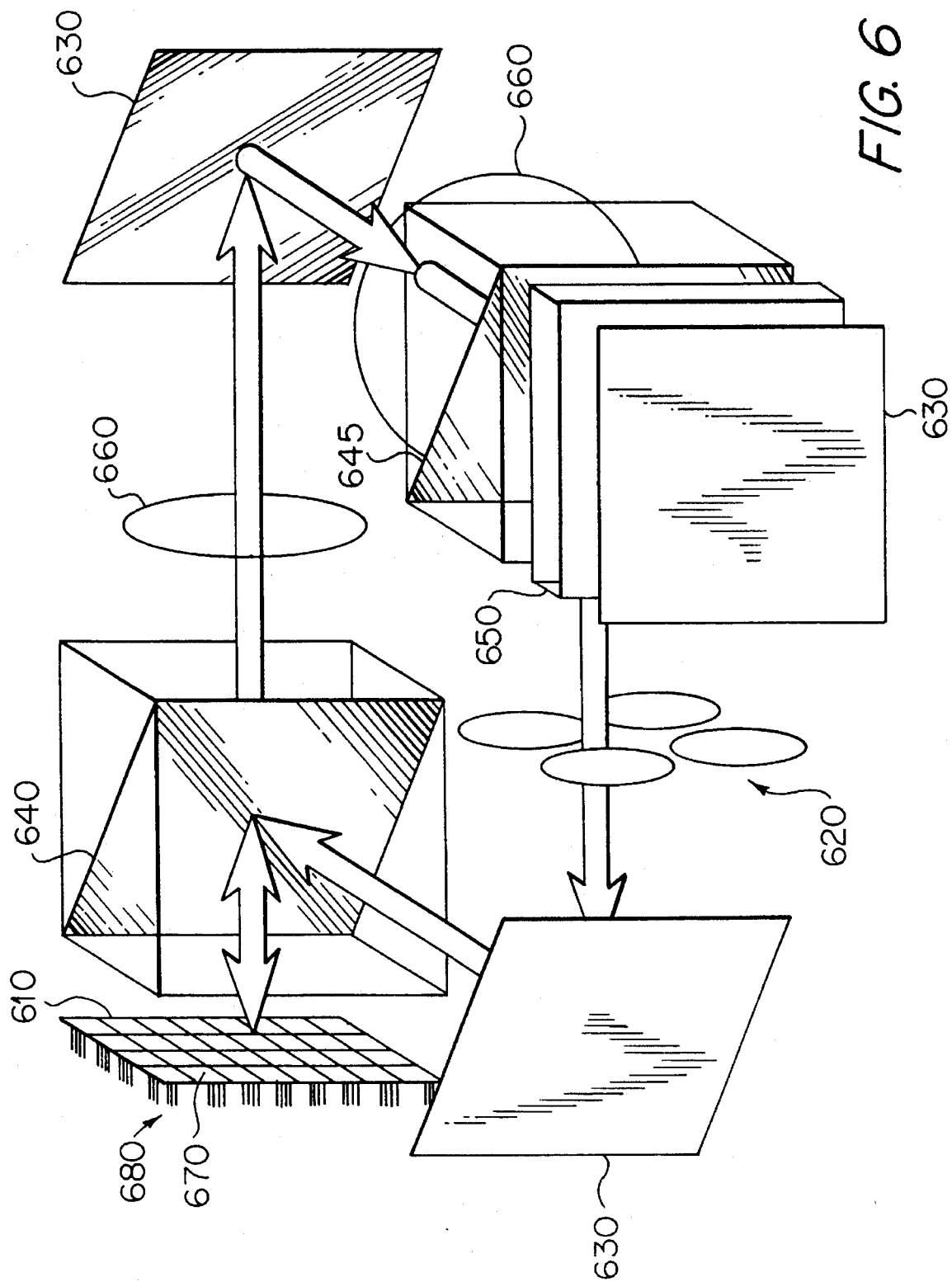

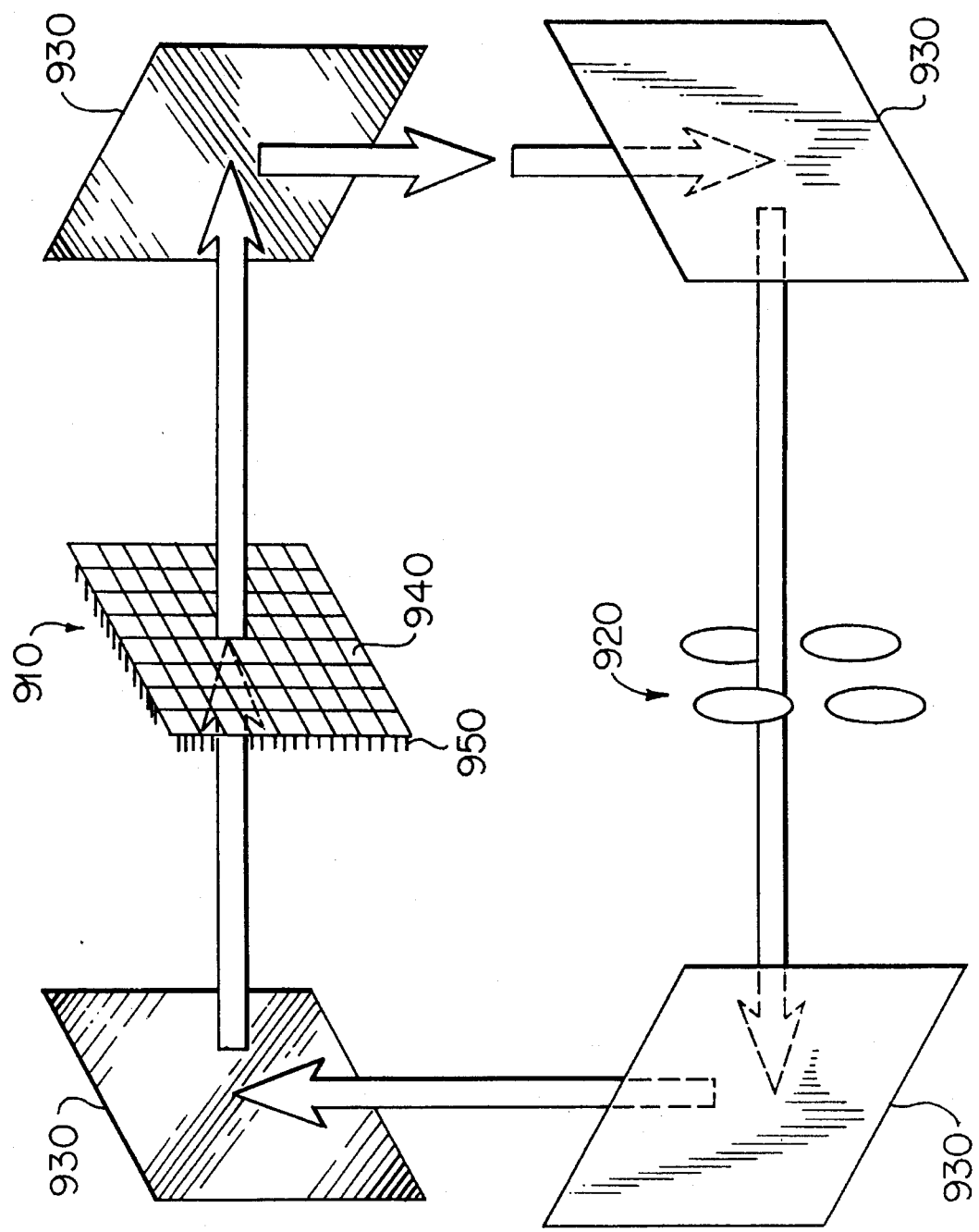

OPTOELECTRIC SLIDING BANYAN NETWORK

BACKGROUND OF THE INVENTION

The government of the United States of America has a non-exclusive license in this invention pursuant to United States Air Force contract No. F49620-92-C-0062.

The present invention relates generally to broadband data switching networks, and more specifically to optoelectronic banyan switching networks for increasing the efficiency and decreasing the cost of signal switching in a broadband system.

There is an ever-increasing demand for high throughput, cost effective, broadband data switching networks as demonstrated by the explosive growth in the Asynchronous Transfer Mode (ATM) equipment industry. Future switching networks must handle thousands of high bandwidth channels, implying an aggregate capacity for networks in the regime of terabits per second. These requirements exceed the ability of VLSI-based switching technology.

One proposal to meet this high throughput demand involves the use of a self-routing, banyan-based network which uses a deflection algorithm to route packets efficiently to their destinations while minimizing resources for a given blocking rate. In particular, one implementation, the tandem banyan switch, has been proposed. A 2-shuffle tandem banyan switching network is made up of a plurality of banyans all connected consecutively. Each banyan has N signal inputs, N signal outputs and $\log_2 N$ stages, where N is a power of two. Each of the $\log_2 N$ stages comprise (N/2) 2×2 switching elements, each with two signal inputs and two signal outputs, and any switching logic required to properly route signals through the stage. The individual stages, therefore, also have N inputs and N outputs. The N inputs of the first stage serve as the N inputs for the banyan and the N outputs of the final stage serve as the N outputs of the banyan. The remaining inputs and outputs are connected consecutively to each other, the outputs of the $i^{th}$ stage being connected to the inputs of the $(i+1)^{th}$ stage. The switching elements in the stages allow an input signal to pass to either of the two switch outputs depending upon the switching element's control logic and a destination address contained in the signal. The inputs and outputs of the various stages are connected in such a way that there is a unique path through the banyan from any of the N inputs to any of the N outputs. The network is called a 2-shuffle because it uses switches with 2 inputs connected to two possible outputs (2×2 switch).

The particular configurations of the connections between the stages in a banyan may vary depending upon the needs of the system. Three possible banyan designs including different connections are disclosed in *Architecture, Performance and Implementation of the Tandem Banyan Fast Packet Switch* by Tobagi et al., IEEE Journal on Selected Areas in Communications, Vol. 9, No. 8, October 1991, pp. 1173–1193. In particular, Tobagi discloses on page 1175 the connections for a baseline network, a modified data manipulator, and an omega network. Illustrations of the connections for these three banyan networks are shown respectively in FIGS. 1A–1C. As these drawings illustrate, the connections between the stages of a banyan may be identical as in FIG. 1C, or may differ among stages as in FIGS. 1A and 1B.

Although each of the connections shown in FIGS. 1A–1C show a 2-shuffle connection, with the stages being made up of 2×2 switches, other connections are possible for other shuffle sizes. In general, a banyan having N inputs and N outputs is implemented with a k-shuffle by using $\log_k N$ stages comprising k×k switches. As with a 2-shuffle, the k×k switches in the stages of a k-shuffle are connected in such a way that there is a unique path through the banyan from any of the N inputs to any of the N outputs.

The signals passing through the banyan are often self-routing. This means that at each stage of the banyan, the switching logic can route the signal without any additional information beyond that contained in the signal. Self-routing signals contain a header with destination data indicating the destination address. Usually these destination data include the binary coded decimal address of the destination. One method by which self-routing is accomplished involves routing the signal at each stage according to a different bit in the destination address. Generally, the bit used for routing corresponds to the order of the stage that the signal is in, i.e., the first bit of the address is used for routing in the first stage, the second bit is used in the second stage, and so forth.

An example of self-routing in the omega network banyan shown in FIG. 1C will be explained with reference to FIG. 2. In FIG. 2, the banyan has sixteen inputs and four stages, each switching stage comprising eight 2×2 switches. The input and output nodes of the banyan are labeled in binary coded decimal from 0000–1111 (0–15) and correspond to the input address and output address, respectively. At each stage, the switching logic and the switches route the signal according to a bit in the signal's destination address corresponding to the order of the current stage. The switches route the signal low if the bit is a logical "1" and high if the signal is a logical "0".

In the example illustrated by FIG. 2, the signal has an input address of 0010, and a destination address of 1011. The heavy line in FIG. 2 shows the passage of the signal through the four stages of the banyan. Upon entry into the banyan, the signal is routed to the fifth node of the first stage, i.e., the top input of the third 2×2 switch from the top in the first stage. This initial routing depends entirely upon the signal's input address and may vary among the any of the inputs to the banyan without affecting its routing performance. In the first stage, the switch routes the signal based on the first bit in its destination address. In this example, the first bit of the destination address is "1", so the switch routes the signal through the low output of the switch. Similarly, the switches in the second through fourth stages route the signal according to the second through fourth bits of the destination address, high, low, and low, respectively, arriving correctly at output address 1011.

Although the signal in this example started at input address 0010, the starting address is irrelevant to the routing. The signal could start at any of the sixteen input addresses and, by branching at each stage according to the corresponding bit in the destination address, would arrive at the correct output address. This input irrelevance occurs because the connections between the switches in the various stages are made such that there is a unique path from each input to each output.

The connection used between stages in the omega network banyan is called a perfect shuffle (PS). A PS is performed on a one-dimensional (1-D) array by interleaving the elements of the first half of the array with those of the second half, with the first and last elements remaining unchanged in their positions. For example, the PS of the eight-element array {1, 2, 3, 4, 5, 6, 7, 8} is {1, 5, 2, 6, 3, 7, 4, 8}. The connections between the stages in FIGS. 1C and 2 show PS connections for a sixteen-element array. A further discussion of the PS appears in "Parallel Processing with the Perfect Shuffle" by H. Stone, IEEE Trans. Comput., C-20, 153 (1973).

A tandem banyan network using PS connections is shown in FIG. 3. The three banyans shown are connected together by a PS connection. Within each banyan, every stage is connected to the next stage by a PS connection. The PS connections in each stage are coupled to an array of 2×2 switches to route the signals to the next stage. In a PS-based tandem banyan network, each stage and therefore each banyan is identical. A PS-based banyan can perform arbitrary permutations of the elements in interconnection networks for applications such as routing and sorting.

In a banyan, a signal is input at each stage to one of the N/2 switches and is output from one of the two outputs of that switch. For all but the final stage, this output is directly connected to the input of one of the switches in the next stage. The connections between the stages are designed so that by passing through the entire banyan, a signal can travel from any one of the N inputs to any one of the N outputs by a unique path. The routing of a signal through the banyan is generally implemented through the use of a destination address having $\log_2 N$ bits. As the signal passes through each stage of the banyan, the banyan control logic examines the corresponding bit in the destination address to determine how the signal should branch from the switch to which it is input in that stage.

This approach would allow for perfect routing of the N signals through a single banyan with $\log_2 N$ stages if no two signals were ever simultaneously routed to the same output of a given switch in a particular stage. Unfortunately, given the realities of signal routing, this is not the case. As multiple signals pass through the banyan, collisions between two of the signals inevitably occur. In order to preserve the functioning of the system, when the network determines that a collision will occur, it avoids the actual collision by allowing one of the signals to succeed and continue through to the next stage via the desired output, and causing the remaining signal to fail and proceed to the next stage via the other output of the 2×2 switch.

The signals that fail in one stage of an individual banyan are treated as automatically failing signals in any later stages in the banyan. These automatically-failing signals defer in any further collisions to signals that have only been successfully routed in previous stages. At the end of the first banyan in the tandem banyan network, the signals that have passed through all of the stages of the banyan with no collisions or with only successful collisions are routed to the output of the tandem banyan network. All failing signals have their failure status removed and are routed to the beginning of the second banyan.

This second banyan is constructed and operates identically to the first banyan. However, since the second banyan only accepts as inputs the signals that failed passing through the first banyan, fewer signals must pass through the second banyan and so fewer collisions are likely to occur during signal routing. A third identical banyan is in turn connected to the end of the second banyan to process any failed signals from the second banyan, and so on until the probability of a collision occurring in the banyan drops to an acceptably low value. Computer simulations predict that for a 4-shuffle tandem banyan network with 1024 inputs to achieve a probability of collision (also called blocking probability) of $10^{-6}$ it would require 40 stages or eight banyans. This can be seen in *Optical Freespace Sliding Tandem Banyan Architecture for Self-routing Switching Networks*, by Michael W. Haney and Marc P. Christensen, Technical Digest of the International Conference on Optical Computing, Edinburgh, Scotland, Aug. 22–25, 1994.

As noted above, the signals passing through the tandem banyan network are often self-routing. A standard tandem banyan network for use with self-routing signals requires that the header include both the destination address and a conflict bit to determine if the packet has been misrouted, i.e., whether a collision has occurred. This conflict bit will be initially set to indicate no conflict, but will be changed for the duration of a banyan if an unsuccessful collision occurs. In some implementations of the tandem banyan network, the destination addresses will be rotated by one bit in each stage as it is routed, so that the next stage need only inspect the first address bit to determine the how to perform the switching.

The tandem banyan network contains some inherent inefficiencies, however. Any routing steps performed on a failed signal are lost time and effort. Unfortunately, since a signal's failed status can only be removed at the end of a banyan, any signals that fail prior to the final stage of a banyan must pass through more than one stage as a failed signal. In a worst case, a collision will occur in the first stage of a banyan. When this happens, the failed signal must idly pass through all the remaining stages of the banyan before it can meaningfully resume its self-routing at the start of a new banyan.

This problem occurs because signals in the tandem banyan network can only be output, and thus removed from contention for signal lines in the network, when they have passed through an entire banyan successfully. If a signal fails in just one stage in a banyan, it no longer meets this criterion and must wait until the next banyan to try again.

In addition to the problem of wasted time and routing efforts, the tandem banyan encounters problems with power consumption. As the number of stages in the tandem banyan network increases, so to does its power consumption. As shown in FIG. 3, at the end of each banyan in the network, the N outputs of the banyan are each connected to the N outputs of the network by connecting signal lines. These lines allow signals that have been successfully routed in a particular banyan to exit the network. Each of these connecting signal lines requires a line driver, however, and each line driver requires a discrete amount of power. For networks with a large value for N, the power consumption of these line drivers can become high since each additional banyan requires N additional line drivers. A tandem banyan with 5 banyans and N=1024, for example, would require 5,120 line drivers as well as additional logic to direct the 5,120 output lines. If each of the line drivers only requires about 10 mW of power, just the drivers for the removal of data from the network in the network will require over 50 W of power.

SUMMARY OF THE INVENTION

Accordingly, the present invention is directed to a sliding banyan switching network that substantially obviates one or more of the problems due to limitations and disadvantages of the related art.

This invention reduces the complexity and latency of the switching network by reducing the number of stages required for a given performance standard as compared with a tandem banyan network. This invention also reduces power consumption by providing only a single pinout from each possible switching destination.

In accordance with one feature of the invention, a signal that has stopped routing due to a collision in one stage of the network restarts its routing immediately in the next stage following the collision without waiting for all successful signals to complete passing through the banyan.

In accordance with another feature of the invention, all stages for a particular node are contained on the same integrated circuit (IC) with a single external input pin and a single external output pin. Each of these ICs are in turn placed on a single coplanar surface. Signals are optically passed from one chip to another through optical routing, but signals into or out of the network all pass along one of the external input or output pins.

In accordance with yet another feature of this invention, all stages for a particular node are placed on two ICs. The two ICs are distributed on two planar surfaces, One IC has a single input pin and a single output pin, the other IC has no external connections. Signals are optically passed from the ICs on one planar surface to the ICs on the other planar surface by optical routing, but signals into or out of the network all pass along one of the external input or output pins.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

To achieve these and other advantages and in accordance with the purpose of the invention, as embodied and broadly described, the self routing sliding banyan switching method of the present invention includes the steps of: receiving N signals in N input positions in a stage, each signal having associated destination data, the destination data including a destination address and a routing count, determining the routing of the N signals received in the N input positions based on decoding of the destination data, detecting whether any two of the N signals are to be routed to the identical first output position in the stage and therefore will collide, assigning one of the two colliding signals as a successful signal and the other of the two colliding signals as a failed signal if a potential collision is detected, sending the successful signal to the first output position and sending the failed signal to a second output position in the stage, incrementing the routing count for each successful signal to reflect a successful routing and setting the routing count for each failed signal to the original count, recognizing as completely routed any signal having a routing count equal to a predetermined value, and outputting the completely routed signal from its current output position toward its destination, transmitting all signals with a routing count not equal to the predetermined value to input positions in the next stage corresponding to respective output positions in the current stage, and repeating the process for all transmitted signals received at the next stage until all of the N signals are outputted.

In addition to further achieve these and other advantages and in accordance with the purpose of the invention, as embodied and broadly described, the invention also recites a sliding banyan switch for optoelectronically switching signals based on destination data contained in the signals, comprising: N signal input lines for receiving N signals, N signal output lines for transmitting the N signals, N coplanar processing element arrays, each processing element array being on a single substrate and being connected to one of the N signal input lines and one of the N signal output lines, each processing element array having a plurality of light sources and light detectors and self-routing switching logic connected to said light detectors and input lines, the self-routing switching logic accepting a first signal from the N signal input lines or the plurality of detectors and designating that the first signal be routed to one of the plurality of light sources based on decoding of the destination data in the first signal, at least one mirror spaced from the coplanar processing element arrays so that light images from the light sources of the coplanar processing element arrays are passed along a light path back toward the coplanar processing arrays, a plurality of shuffling lenses positioned in the light path for manipulating the images from the light sources of the coplanar processing arrays such that each of the plurality of light sources from the coplanar processing element arrays is imaged onto a separate individual one of the plurality of light detectors on the coplanar processing element arrays, means for resolving conflicts between first signals designated to be routed to the same light source by designating one signal as successful and routing it to the designated light source, and designating the other signal as failed and routing the other signal to an alternate light source, means for counting the number of consecutive successful routings for each signal, means for deciding when the number of consecutive successful routings for a signal reaches a predetermined number, and means for routing the successful signal to the signal output line connected to the processing element array where the successful signal was located when the determining means determines that the current number of successful routings reaches the predetermined number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

FIG. 6 is a perspective view of one implementation of an embodiment of an optoelectronic sliding banyan network constructed in accordance with the present invention;

FIG. 9 is a perspective view of an implementation of another embodiment of a sliding banyan network constructed in accordance with the present invention;

DESCRIPTION OF PREFERRED IMPLEMENTATIONS

Reference will now be made in detail to the construction and operation of preferred implementations of the present invention which are illustrated in the accompanying drawings. In those drawings, like elements and operations are designated with the same reference numbers.

The following description of the preferred implementations of the present invention is only exemplary of the invention. The present invention is not limited to these implementations, but may be realized by other implementations.

The present invention is directed to a sliding banyan switching network. A sliding banyan switching network comprises a plurality of stages connected to each other by an identical connection scheme. Each stage comprises N inputs, N outputs, and N/k sets of switching logic, where N is chosen to be a power of k. Each of the sets of switching logic has k signal inputs, k signal outputs, and serves to properly route signals through the stage. The number of stages in a sliding banyan network must be at least the number of stages that would be required for a single banyan, but does not have to be in multiples of $\log_k N$.

Figure 4:
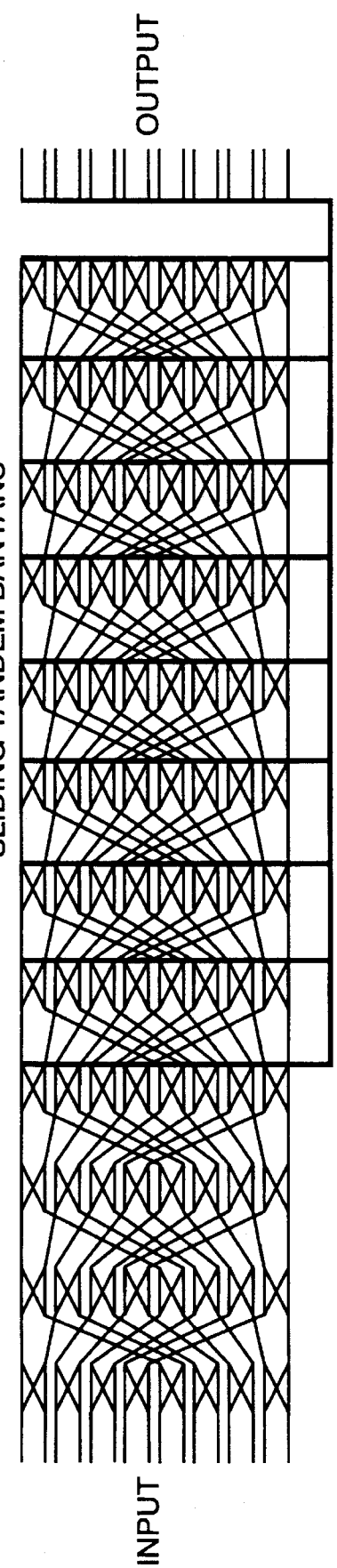
FIG. 4 is a block diagram of a sliding banyan network constructed in accordance with the present invention, having twelve stages.

A block-diagram embodiment of the sliding banyan network having a k of 2, and using perfect shuffle (PS) connections between the stages is shown in FIG. 4. This embodiment is constructed in accordance with the teachings of the present invention and includes a plurality of stages comprising 2×2 switches, each connected together by a PS connection to route the signals. Although this embodiment is directed to a sliding banyan network using a 2-shuffle, other shuffle-order sliding banyan networks are possible.

There are two general routing methods that may be employed, referenced as external control and self-routing. In an externally controlled network routing information from all signals is examined by external circuitry which then sets the switches accordingly. In self-routing control the switching logic is integrated with the switch and examines only a subset of the signals. Various schemes employing a combination of external and self-routing controls are possible. In addition, although this embodiment uses self-routing, other routing schemes are possible. An example of external control appears in *Free-space Photonic Switching Architectures Based On Extended Generalized Shuffle Networks*, by Thomas J. Cloonan et al, Applied Optics, Vol. 32, No. 35, Dec. 10, 1992, pp. 7471–7492.

In this embodiment of the sliding banyan network, signals are input at each stage to the N/2 switches. Each switch that accepts a signal passes the accepted signal to one of the switches two outputs. For all but the final stage, this output is directly connected to the input of one of the switches in the next stage. The connections between the stages are designed so that by passing through $\log_2 N$ stages, corresponding to the length of an entire banyan, a signal can travel from any one of the N inputs to any one of the N outputs by a unique path.

In the preferred embodiments of this invention, the sliding banyan networks are designed to pass signals or packets that contain self-routing information. These self-routing signals or packets preferably contain a header with destination data indicating the destination address. These destination data preferably are in the form of a 2×2 address for the destination and have $\log_2 N$ bits. The destination data also preferably includes a number indicating the current number of consecutive successfully routed stages for the signal, i.e., how many consecutive stages the signal has passed through successfully. As a self-routing signal passes through each stage of the sliding banyan, the switching logic examines the relevant bit in the destination address to determine how the signal should branch from the switch to which it is input in that stage.

In order to preserve the functioning of the system, when the switching logic detects a potential collision between two signals entering a switch, the switching logic allows one of the signals to succeed and continue through to the next stage via the desired output of the switch, and causes the remaining signal to fail and proceed to the next stage via the other, nondesired output of the switch.

Any signals which pass through $\log_2 N$ stages of the sliding banyan network with no collisions or with only successful collisions are routed to the output of the sliding banyan network. In order to determine when this occurs, the sliding banyan network preferably records information in the header of the signal indicating the number of stages through which a signal has been successfully routed. When a signal first enters the sliding banyan network, this number indicates that the signal has passed through zero stages successfully. Each time a signal successfully passes through a stage, the network increments this number. Each time a signal fails in a stage, the number is preferably reset to zero.

The information regarding the number of successful stages is also used to determine which bit of the destination address is to be used for routing. It is best kept to a simple inspection—if the number of successful stages is m, then the $m^{th}$ bit of the destination is preferably the determining one. Furthermore, in order to ensure rapid routing of signals, the sliding banyan gives priority when a collision is detected to those signals which are closest to their destination, i.e., those signals with the highest number of successful stages in their history. This prevents a signal which has just begun its rerouting from interfering with a signal near completion.

At the end of each stage in the sliding banyan network, starting after $\log_2 N$ stages, the signals that have passed through $\log_2 N$ stages of the banyan with no collisions or with only successful collisions are routed to the output of the sliding banyan network. All signals with fewer than $\log_2 N$ successes are routed to the beginning of the next stage.

All stages after the $(\log_2 N)^{th}$ operate identically to the first $\log_2 N$ stages. However, since these later stages only accept as inputs the signals that failed a collision while passing through the previous stages, fewer signals must pass through these later stages. As a result, fewer collisions are likely to occur during signal routing, since each time the network removes a successful signal, the probability of a collision falls. The sliding banyan network includes sufficient stages to insure that the probability of a collision occurring in the final stage reaches an acceptably low value. Computer simulations predict that for a 4-shuffle sliding banyan network with 1024 inputs, it would require 25 stages to achieve a blocking probability of $10^{-6}$. This can be seen in *Optical Freespace Sliding Tandem Banyan Architecture for Self-routing Switching Networks*, by Michael W. Haney and Marc P. Christensen, Technical Digest of the International Conference on Optical Computing, Edinburgh, Scotland, August 22–25, 1994.

For a network size of N=1024, the space-bandwidth product (SBWP) of the optical system employed and the large area of the planar surface allow enough stages to be interleaved in the optical plane to constitute several banyans before resolution or power dissipation constraints appear. As used in this invention, space-bandwidth product is the number of optical resolution elements across the processing element (PE) array as determined by the imaging lenses and serves as a limit on how closely the light sources and light detectors can be packed together on a PE.

The physical co-location of stages afforded by the 3-D optics offers advantages not practical with a VLSI implementation, e.g., packets may be removed from the network at any stage, not just at the end of a banyan. Whenever a packer's route is blocked, i.e., a collision occurs in routing, it is misrouted only once, then it continues normal routing immediately at the next stage. If the packet is not misrouted again then it will reach its destination in $\log_2 N$ stages. This will be the end of this packets' banyan, which has slid or shifted to align with the misrouting incident, and the packet will be removed. With the sliding banyan, resources are not wasted by simply routing misrouted packets to the end of the banyan. Instead, the rerouting begins immediately. After the first $\log_2 N$ stages, packets can leave the network at any stage.

Figure 5A:
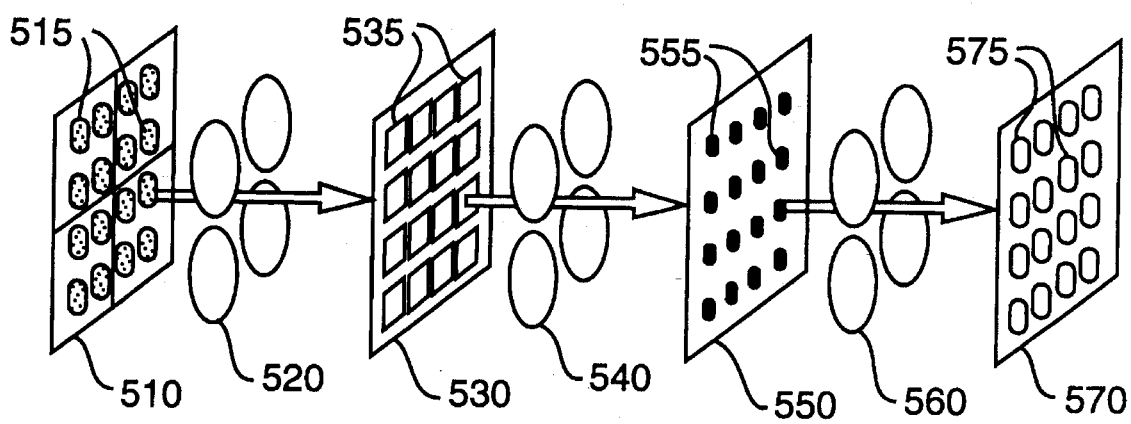
FIG. 5A is a perspective view of one implementation of an embodiment of an optoelectronic sliding banyan network.
Figure 5B:
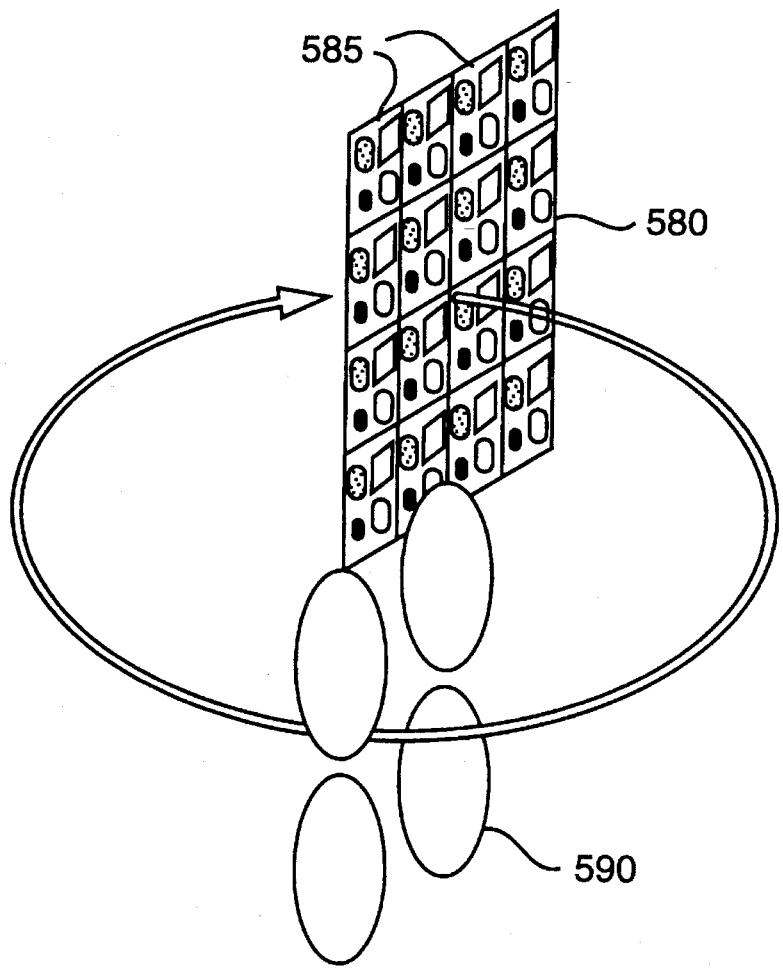
FIG. 5B is a perspective view of one implementation of an optoelectronic sliding banyan network in which the physically separated stages of FIG. 5A are interleaved onto a common plane when constructed in accordance with the present invention.

One implementation of the above embodiment involves a plurality of physically separated stages. Each stage comprising an arrangement of interconnected processing elements. An implementation of this embodiment using four stages 510, 530, 550, and 570 each containing a plurality of processing elements 515, 535, 555, and 575 optically connected via three sets of shuffling lenses 520, 540, and 560 is shown in FIG. 5A. The positions of the processing elements and shuffling lenses are determined by design consideration, e.g., as described in *The Application of Self-similar Patterns to Opto-Electronic Shuffle/Exchange Network Design* authored by Michael W. Haney in the Digest of the Optical Computing Topical Meeting, March 1993, which is herein incorporated by reference. An alternate implementation of this embodiment shown in FIG. 5B interleaves the four stages into one plane 580 thereby creating arrays of processing elements 585 optically connected with each other via one set of shuffling lenses 590.

Figure 2:
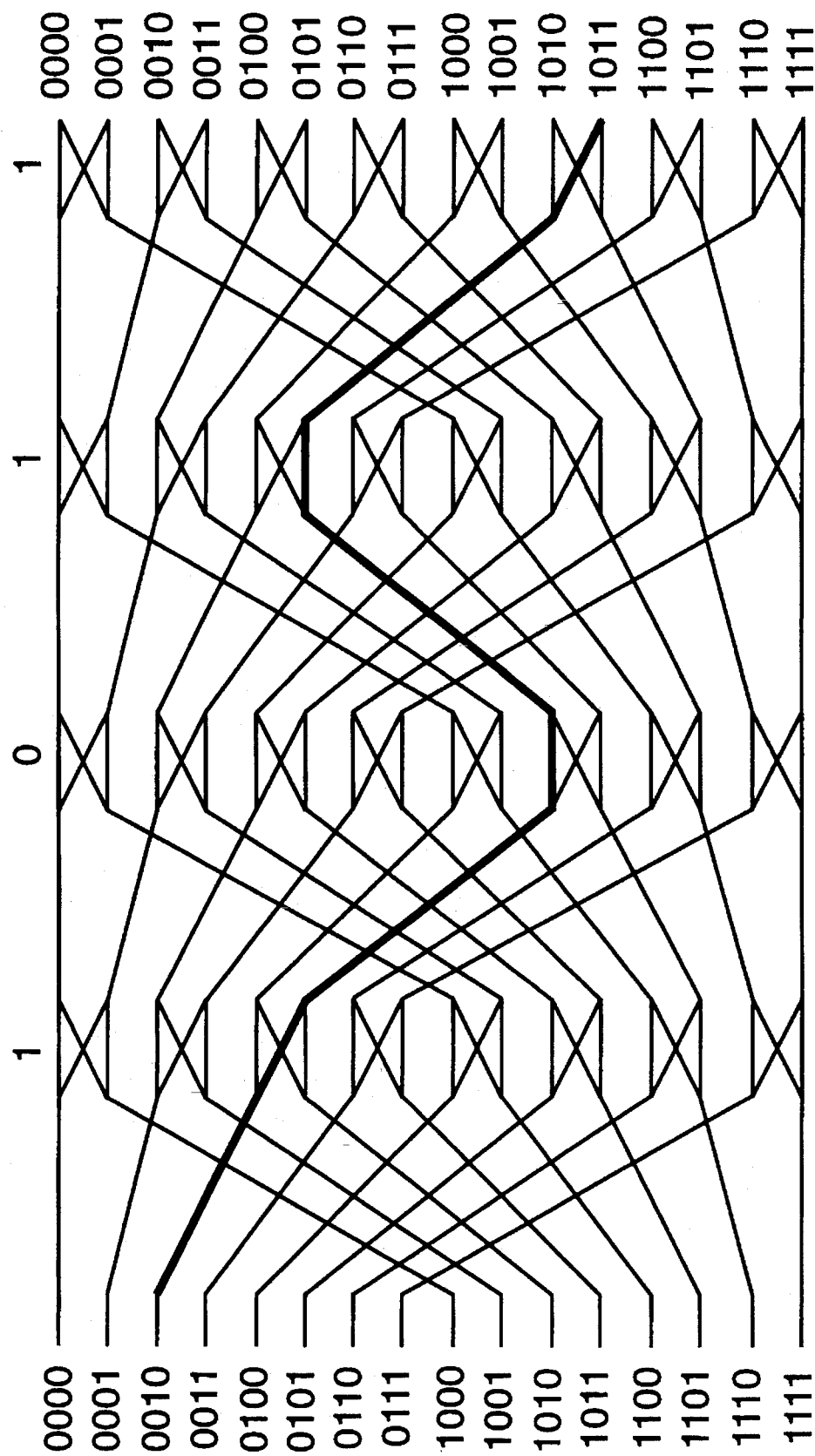
FIG. 2 is a block diagram of the prior art showing the self-routing of a signal through a single omega network banyan.
Figure 3:
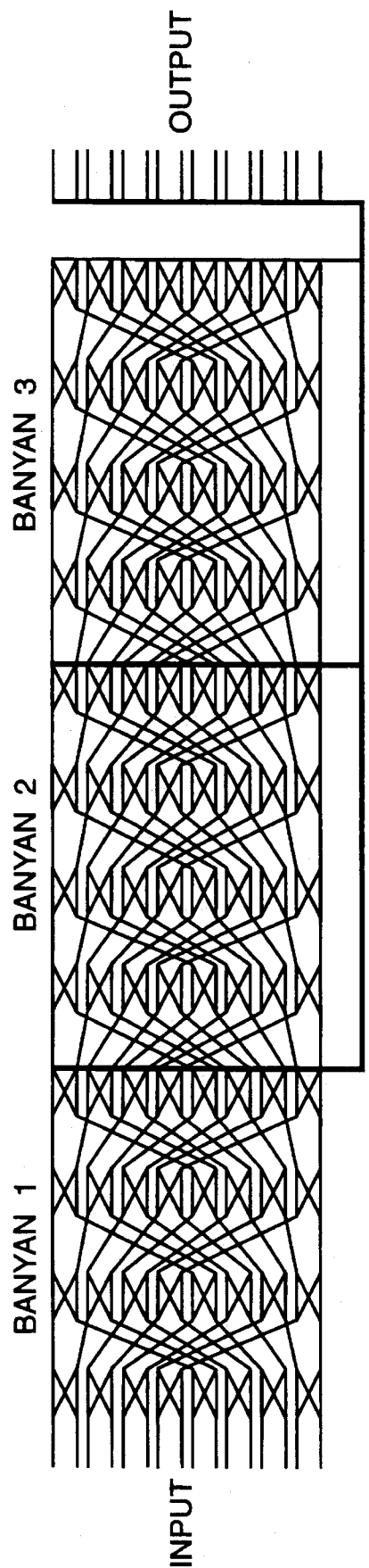
FIG. 3 is a block diagram of a tandem banyan network of the prior art containing three banyans with four stages each.

A preferred implementation of an embodiment of a sliding banyan network of the present invention is shown in FIG. 6. This network includes a planar surface 610, a plurality of shuffling lenses 620, a plurality of mirrors 630, first and second polarized beam splitters 640 and 645, a quarter wave plate 650, and a plurality of imaging lenses 660. The planar surface 610 preferably includes a plurality of interleave processing element (PE) arrays 670, the plurality of processing elements of each PE array being on the same substrate, with each element being connected to two or more input and output pins chosen from a plurality of input and output pins 680. As used in this invention, a PE is a combination of a plurality of light sources and detectors and the switching logic necessary to route signals from the plurality of detectors to the plurality of light sources in some specified combination. The embodiment of FIG. 6 employs a multistage pipelined operation network with an optical implementation of the interconnection pattern of FIG. 2, i.e., a PS optical interconnection pattern. For the purposes of this invention, a multistage pipelined operation network will refer to any network in which a data signal or packet travels constantly forward through a series of light sources and detectors, never passing through the same light source or detector twice.

Figure 7:
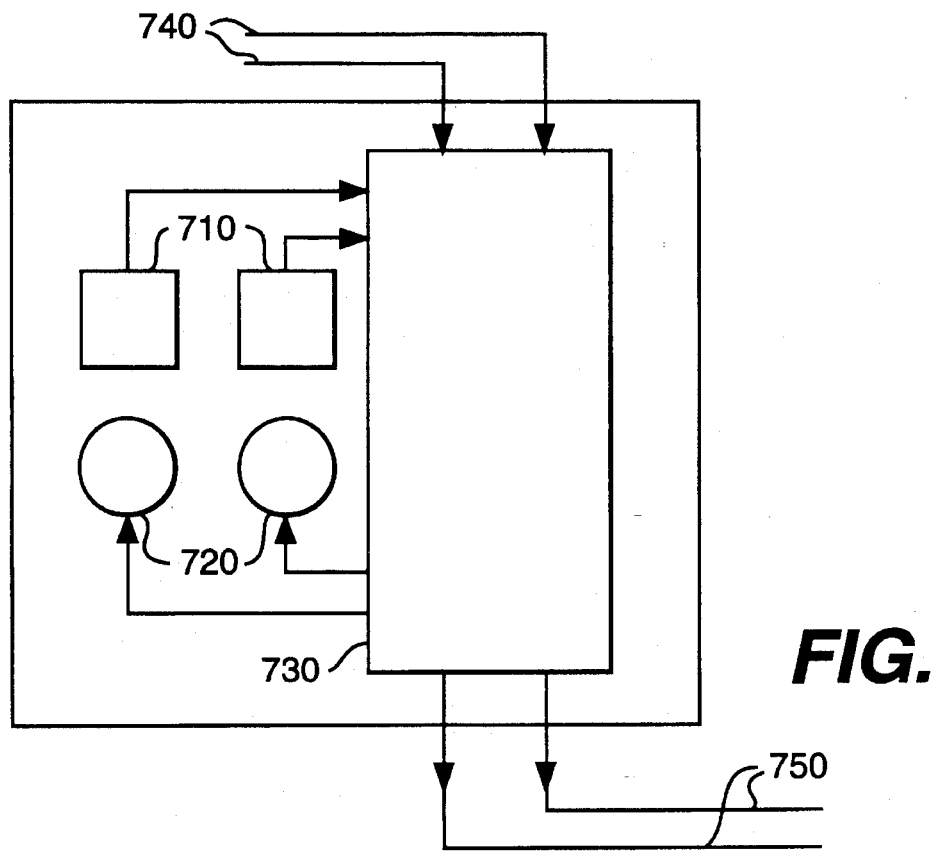
FIG. 7 is a block diagram of a processing element array in the sliding banyan network of FIG. 6.

FIG. 7 is a block diagram of one of the processing elements on the PE arrays 670 shown in the embodiment of FIG. 6. As shown in FIG. 7, each processing element of a PE array 670 preferably comprises two light detectors 710, two light sources 720, and switching logic 730. The light detectors 710 provide signals to the switching logic 730, and the light sources 720 receive signals from the switching logic 730. The switching logic 730 also receives signals from two of the input pins 740 and sends signals to two of the output pins 750, the input and output pins 740 and 750 being chosen from the plurality of input and output pins 680 in FIG. 6. In this embodiment the light sources 720 transmit light polarized in the same direction as the polarized beam splitters are organized.

The switching logic 730 includes a 2×2 switch for each pair light sources and light detectors along with the additional logic necessary to route the incoming signals. The additional logic preferably includes circuitry for determining which output of the switch a signal must take for a successful routing of the signal and the number of consecutive successful routings the signal has had, based on the destination data in the signal's header. The correct switch output is preferably based on the bit in the signal's destination address corresponding to the number of consecutive successful routings the signal has had. The additional logic also preferably includes circuitry for determining whether two incoming signals need to be routed out of the same switch output to achieve a successful routing, and circuitry in such case for determining which of these two conflicting signals will be successfully routed based on the number of consecutive, successful routings the signal has had. Preferably, where a collision would occur, the circuit routes the signal with the largest number of consecutive successful routings. If two signals have the same number of routings, the circuitry sets the switch according to a predetermined setting or randomly chooses between them. Based on these determinations, the 2×2 switch outputs one input signal to its successful output on one output line 750 and outputs the second input signal, if any, to a successful output on the other output line 750 if possible; or outputs the second input signal as a failed output on this other output line 750 if a collision would occur otherwise. In the embodiment of FIG. 7 the switching logic is preferably produced using a combination of FETs, although any other IC circuitry capable of performing the switching logic may be used. In addition, further implementations may include redundancies in the design to provide fault tolerance, e.g., additional elements may be provided on the planar surface to replace failing light sources, light detectors, or switching logic.

Although in FIG. 7, the switching logic is connected to receive signals from two light detectors 710 and two input pins 740, and is connected to send signals to two light sources 720 and two output pins 750, all of these signal lines are not designed to be operational for all of the elements in each PE array. In the processing element in the PE array corresponding to the first stage of the sliding banyan network to which an input is applied, the lines 710 between the light detectors and the switching logic 730 and the lines between the switching logic 730 and the output pins 750 are preferably not connected because no signals are to appear on these lines. Similarly, in the processing elements in the PE array corresponding to the second through the next-to-last stage in the sliding banyan network, the lines between the input pins 740 and the switching logic 730 and the lines between the switching logic 730 and the output pins 750 are not connected. Additionally, in the element in the PE array corresponding to the last stage of the sliding banyan network, the lines from the input pins 740 to the switching logic 730 and the lines from the switching logic 730 to the light sources 720 are not connected.

Figure 1A:
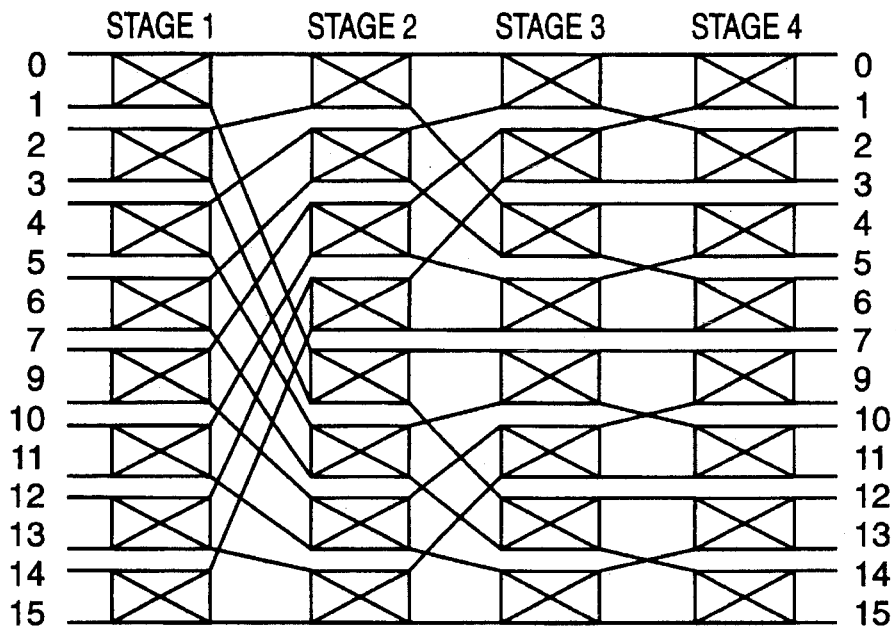
FIG. 1A is a block diagram of the prior art showing the connections between stages in a baseline network.
Figure 1B:
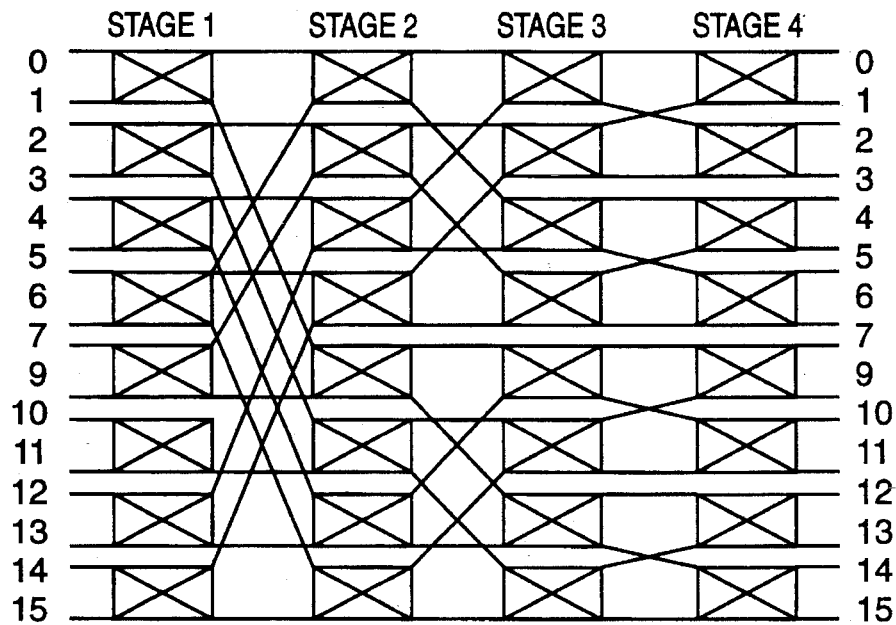
FIG. 1B is a block diagram of the prior art showing the connections between stages in a modified data manipulator network.
Figure 1C:
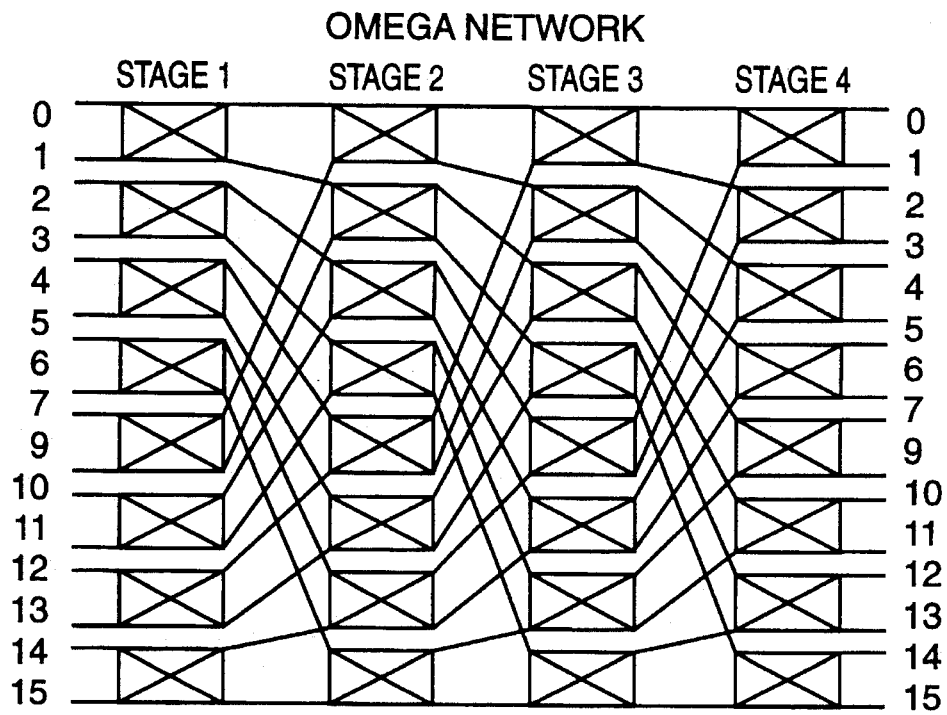
FIGS. 1C is a block diagram of the prior art showing the connections between stages in an omega network.
Figure 8A:
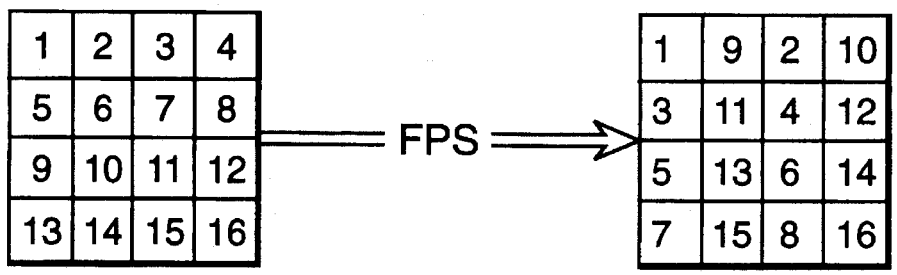
FIG. 8A is a diagram showing the operation of a folded perfect shuffle performed on signals in accordance with a preferred embodiment of the present invention.

In the embodiment of FIG. 6, the stages of the sliding banyan network are connected with a PS connection. This means that a PS is performed for each stage of the sliding banyan network. Due to the placement of the PE arrays 670 in a 2-D format on the planar surface 610 (FIG. 6), however, the PS is performed on a long 1-D array, i.e., the input signals, that has been rastered (folded) into a 2-D format, i.e., the placement of the PE arrays on the planar surface. This particular 2-D implementation of the PS is called the folded perfect shuffle (FPS). The input-output patterns for the FPS are shown in FIG. 8A for PE arrays. i.e., N=16. The FPS takes advantage of the natural 2-D array format of optical switches, yet is not limited in the array size by one spatial dimension. Since a 1-D PS is being performed, the active switches between the PS interconnections comprise arrays of 2×2 switches (not shown).

Preferably the shuffling lenses 620 (FIG. 6) comprise four imaging lenses, one for each quadrant of the PE array 670, that magnify (by a factor of 2) and overlap the four quadrants such that the desired shuffle pattern appears at the output of the lens and thus at the input to the next stage. The required interlacing is preferably accomplished by skewing the four imaging lenses with respect to one another to achieve the desired FPS pattern and placement of the PE arrays on rectilinear grids.

Figure 8B:
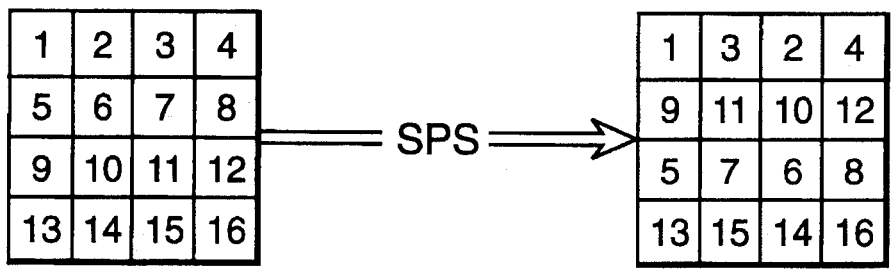
FIG. 8B is a diagram showing the operation of a separable perfect shuffle performed on signals in accordance with a preferred embodiment of the present invention.

Alternatively, a separable perfect shuffle (SPS) can be performed for each stage of the sliding banyan. In an SPS, the elements of a 2-D array are perfect shuffled in the horizontal and the vertical directions independently. In this embodiment the SPS can perform arbitrary permutations in fewer stages than the standard PS, but the network requires more complex arrays of 4×4 routing switches in the SPS stages. FIG. 8B shows the input-output patterns for the SPS for N=16 PEs.

The operation of the optical routing performed by the embodiment of the invention shown in FIGS. 6 and 7 will now be described. When one or more of the light sources 720 from an element of a PE array 670 transmit signals, the light from these sources 720 passes along the light path 690 and is imaged through the first and second polarizing beam splitters 640 and 645, through the quarter-wave plate 650, onto one of a plurality of mirrors 630, and back through the quarter-wave plate 650. This rotates the polarization of the image by 90° so that when it encounters the second polarizing beam splitter 645 on its return path, it is reflected onto a new path rather than following its original path. The new path takes the image through the shuffling lenses 620 to the first polarizing beam splitter 640. Again, since the image has been rotated, it reflects off of the first polarized beam splitter 640 and back to the desired light detector 710 on one of the PE arrays 670.

The remainder of the plurality of mirrors 630 in FIG. 6 are used to route the image along its path. The plurality of imaging lenses 660 are used to retain the cohesiveness of the image. The polarizing beam splitters 640 and 645, mirrors 630, and quarterwave plate 650 ensure that the image is not flipped left to right as it is folded back to the PE plane. The PEs 670 are arrayed on a 2-D rectilinear grid and preferably reside on integrated circuits held in place using conventional IC packaging technology. 2×2 switches within switching logic 730 of FIG. 7, preferably located adjacent to light detectors 710 and sources 720, switch the data signals according to their addresses and the proper switching logic as described previously, and route them either to a light source 720, and then to the next shuffle path in the banyans, or to one of the output pins 750 after the multistage routing is completed.

One implementation of the switching logic 730 can be made using the circuit design disclosed in The Product Description For LattisCell, by SynOptics Communications, Inc., ID Number: PU470-1672US-A, Sep. 8, 1994, pp. 1–16, which is herein incorporated by reference, with the lattice cell product description enhanced to include circuitry for the management of a routing success counter.

In the case which N is a few thousand inputs or less, the 2-D shuffle uses only a small fraction of the 2-D space-bandwidth product (SBWP) of the optical system. Thus, the sliding banyan network can be configured as a pipeline with a single optical system used for all stages.

The layout of the light sources and light detectors may vary depending upon the details of the application, such as the number of stages, the type of shuffle, the size and the design constraints of the electronic parts of the PE, and the nature of the required optoelectronic interface circuitry. In general, it is desirable to locate associated input and output elements close to each other to minimize the amount and the complexity of local electronic interconnections in each PE pair.

In the second preferred embodiment using an FPS, as the signals propagate through a stage of the network, the 2×2 switches pass the detected signals from one stage onto the spatially displaced light sources for transmission to the next stage. At the final stage, the data are fed out of the switching fabric through the associated output pins to their destination.

The number of stages that can be connected in this way has an upper bound of SBWP/N, where the SBWP is the number of resolvable spots at the output plane of the shuffle optics. Since the number of stages required for a banyan network is on the order of 3–5 $\log_2 N$ for a $10^{-6}$–10 bit error rate, the total SBWP requirement for a pipelined sliding banyan network will grow as the number of input signals N grows only on the order of $N \log_2 N$. Lenses can typically be obtained with a SBWP of much greater than $10^6$, providing the capability for a large amount of inputs and banyan network stages.

The limiting latency in the network is due to the round-trip delay of the optical signals in the 2-D shuffle optics. For a PE array 610 that is several inches on a side, a 2-D PS optical system is approximately 0.25 m in length. Accounting for the return trip through the folded optical system leads to a latency estimate of approximately 2 ns per stage. Because the shuffle imaging optics are not telecentric, there is a variation in interstage path lengths across the elements of the shuffled array. The path differences manifest themselves as time skews between PE's and must be corrected for synchronous operation. In an embodiment where the PE array is several centimeters on a side, the worst-case time skew is approximately 50 ps, with a PS optical system that is approximately 0.25 m in length. In other embodiments with longer optical systems, the time skew will be correspondingly less. This results from a direct trade-off between the latency/stage and the skew/stage in the embodiments of the 2-D shuffle system.

Another implementation of the invention is shown in the embodiment of FIG. 9, where the light detectors are placed on the opposite side of a planar surface from the light sources. As shown in FIG. 9, the sliding banyan network of the present invention includes a planar PE array surface 910, a plurality of shuffling lenses 920, and a plurality of mirrors 930. The planar surface 910 includes a plurality of processing element (PE) arrays 940, the elements of each PE array being on the same substrate, and being connected to two or more input and output pins chosen from a plurality of input and output pins 950. This preferred embodiment implements a multistage pipelined operation network with the optical interconnection pattern of FIG. 4, i.e., a PS interconnection pattern. An imaging lens system may be used in addition to the shuffling lenses. The exact placement of the lenses will be affected by the array pattern, the type shuffle used, and placement of any imaging optics.

Figure 10:
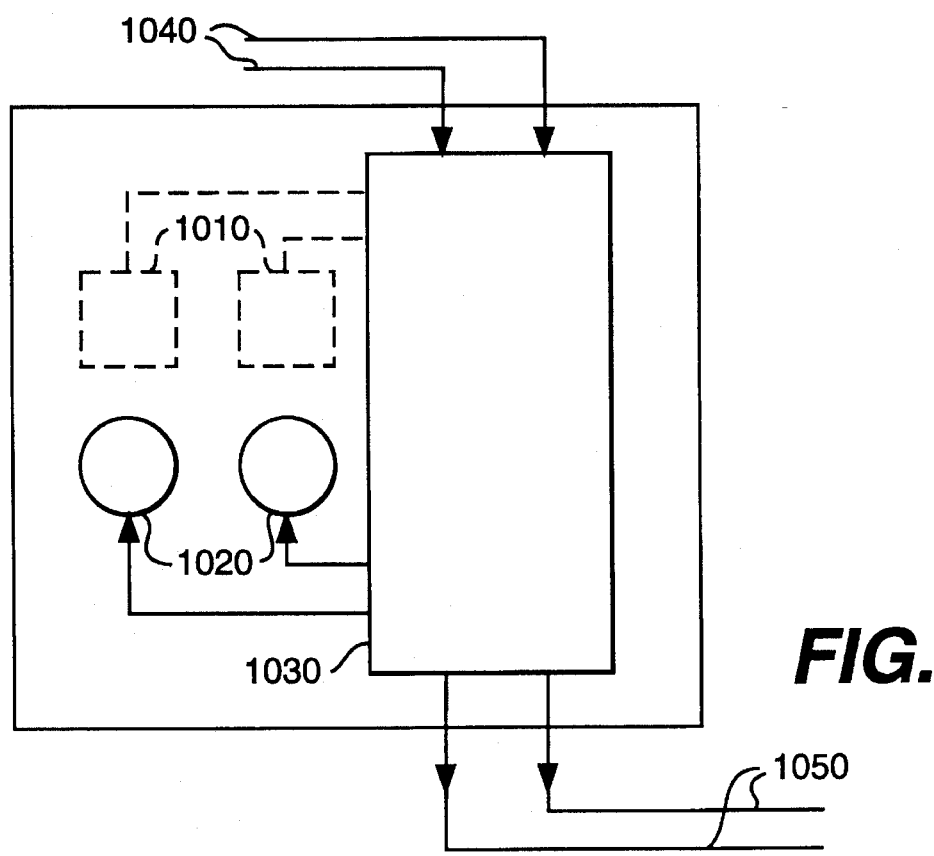
FIG. 10 is a block diagram of a processing element array on the planar surface of the embodiment of FIG. 9.

FIG. 10 is a block diagram of one of the elements on one of the PE arrays 940 shown in the third preferred embodiment in FIG. 9. As shown in FIG. 10, the element comprises two light detectors 1010, two light sources 1020, and switching logic 1030. The light detectors 1010 provide signals to the switching logic 1030, and the light sources 1020 receive signals from the switching logic 1030. The switching 1030 logic also receives signals from two of the input pins 1040 and sends signals to two of the output pins 1050, the input and output pins 1040 and 1050 being selected from the plurality of input and output pins 950 in FIG. 9. The switching logic 1030 comprises a 2×2 switch for each pair along with the logic necessary to route incoming signals as described in connection with switching logic 630 in FIG. 6. The dashed lines on FIG. 10 indicate the light detectors 1010 are on the backplane of the substrate containing the light sources 1020 and the switching logic 1030. In alternate embodiments, however, the light detectors 1010, light sources 1020, and switching logic 1030 can be placed either on the front or back of the substrate, provided the light detectors 1010 and light source 1020 are kept on opposite sides. The switching logic 1030 may even be partly on the front and partly on the back of the substrate.

Although in FIG. 10 the switching logic 1030 is shown as receiving signals from two light detectors 1010 and two input pins 1040, and sending signals to two light sources 1020 and two output pins 1050, all of these signal lines are not connected for all of the elements in each PE array, as described above with respect to the embodiment of FIGS. 5 and 6.

In the embodiment of FIGS. 9 and 10, the stages of the sliding banyan network are connected by a PS connection. This means that a PS is performed for each stage of the sliding banyan network, just as in the embodiment described for FIGS. 5 and 6. The same design of shuffling lenses 920 is preferably used in the present embodiment as was described above for the earlier embodiment of FIGS. 5 and 6.

The operation of the optical routing performed in FIGS. 9 and 10 will now be described. When one or more of the light sources 1020 from an element of a PE array 940 transmit signals, the image of each transmitting light source is routed by the plurality of mirrors 930 from the front of the planar surface 910 to the backplane of the planar surface 910.

The path taken by the image passes through the shuffling lenses 920, which preferably operate the same as the shuffling lenses 620 described with reference to the embodiment shown in FIG. 6.

Figure 11:
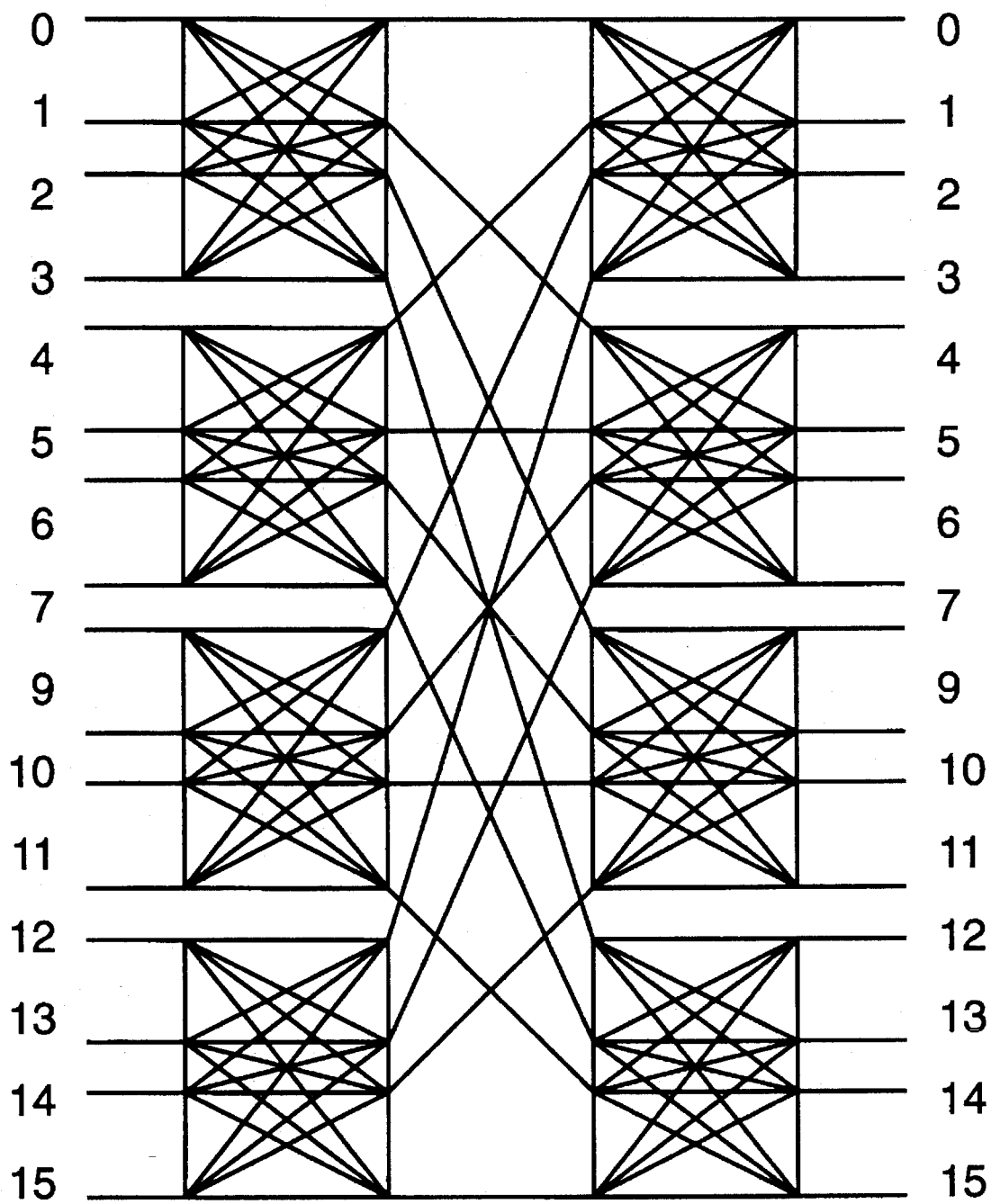
FIG. 11 is a block diagram showing the connections between the stages in a 4-shuffle banyan network.

Another embodiment of the sliding banyan network generalizes the perfect or 2-shuffle to a higher shuffle order k. FIG. 11 shows 16 nodes interconnected by a 4-shuffle (k=4). This shuffle portion could be affected by the embodiment shown in FIG. 12, and includes a first planar surface 1210, a first plurality of lenses 1220, a second plurality of lenses 1230, and a second planar surface 1240. The first planar surface 1210 includes a plurality of first processing element (PE) arrays 1250, each first PE array being on a single substrate and being connected to an input and an output pin chosen from a plurality of input and output pins 1260. The second planar surface 1240 includes a plurality of second processing element (PE) arrays 1270, each second PE array being on a single substrate (IC). No input or output pins are associated with this second planar surface 1240.

Figure 12:
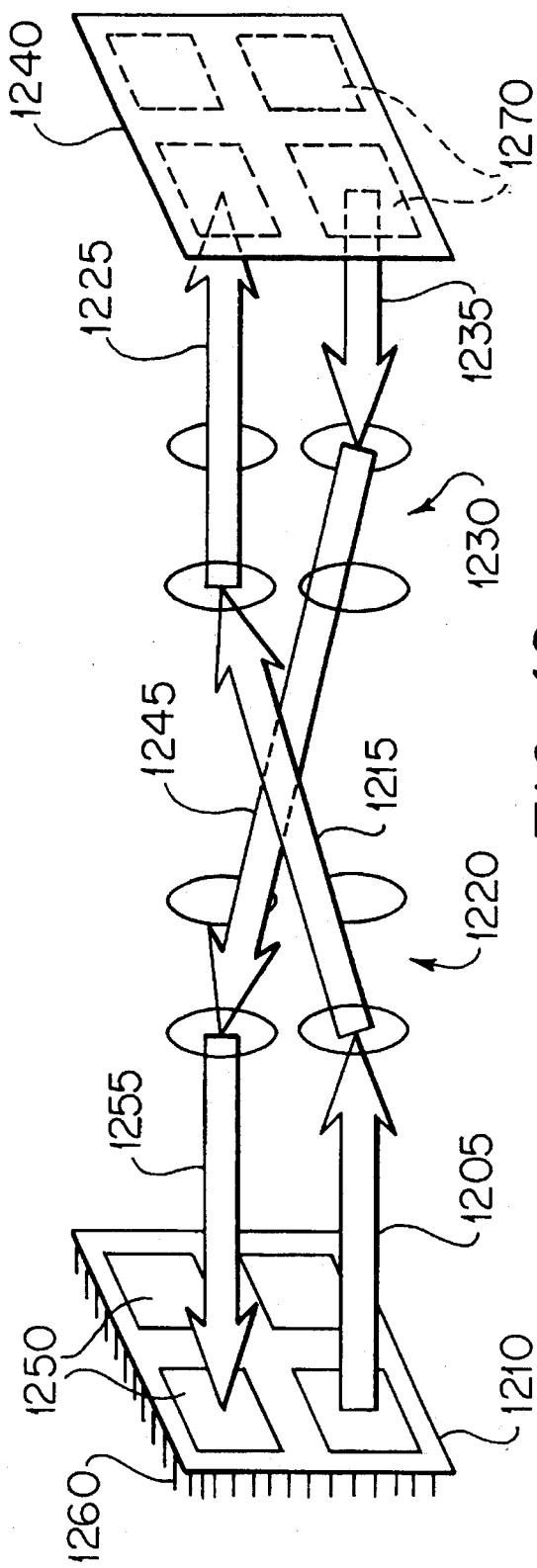
FIG. 12 is a perspective view of an implementation of another embodiment of a sliding banyan network constructed in accordance with the present invention.
Figure 13:
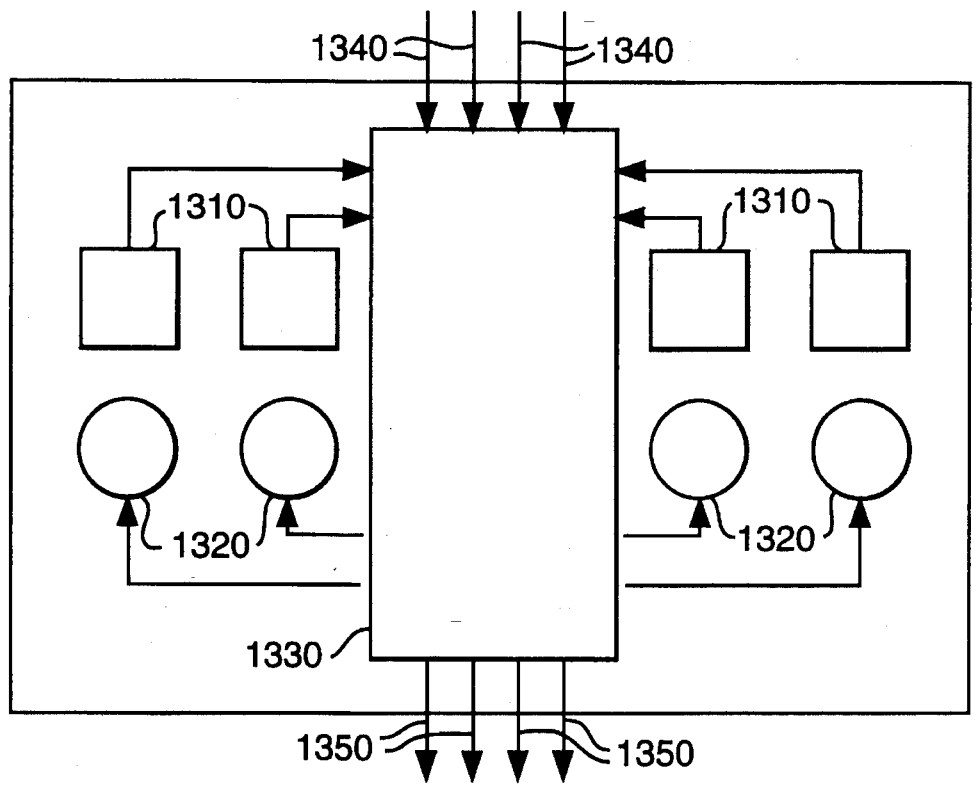
FIG. 13 is a block diagram of a processing element array on the first planar surface of the embodiment of FIG. 12.

FIG. 13 is a block diagram of one of the elements of the first PE arrays 1260 that are used to implement the sliding banyan network of FIG. 12. In FIG. 13, the light sources and detectors are arrayed in the same plane, as shown in FIG. 6, but here for M=4 stages. The PE array shown in FIG. 13 preferably includes four light detectors 1310, four light-emitting diodes 1320 serving as light sources, and self-routing switching logic 1330 to which the light detectors and diodes are connected. The self-routing switching logic 1330 is connected to a single input pin 1340 and a single output pin 1350 for each of the four stages. Thus, four input pins 1340 and four output pins 1350 are chosen from the plurality of input and output pins 1250 in FIG. 12.

Figure 14:
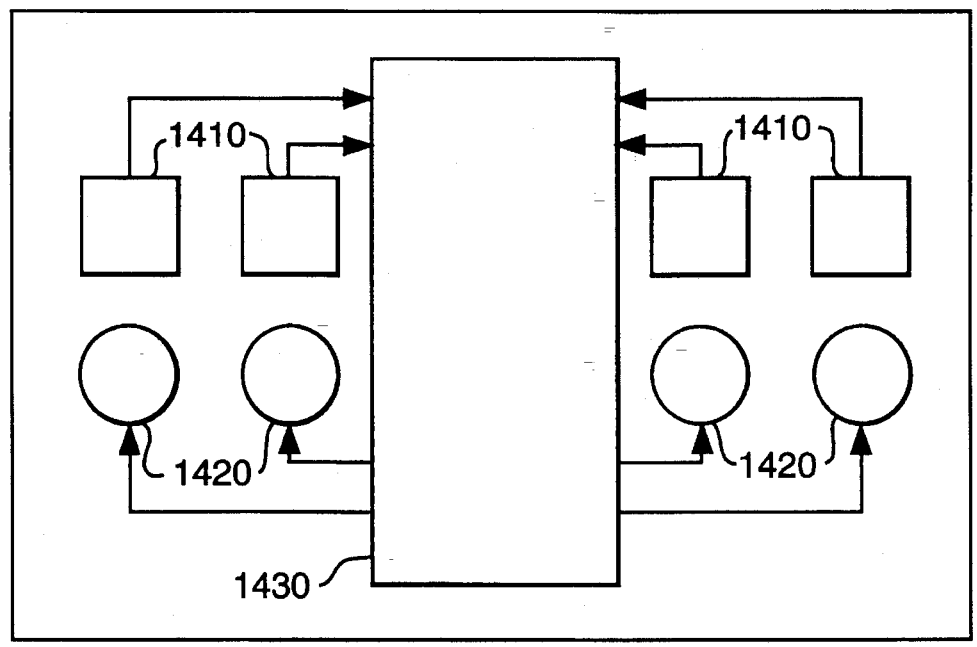
FIG. 14 is a block diagram of a processing element array on the second planar surface of the embodiment of FIG. 12.

FIG. 14 is a block diagram of one of the second PE arrays 1240 that are used to implement the sliding banyan network of FIG. 12. In FIG. 14, the light sources and detectors are arrayed in an interleaved fashion, as shown in FIG. 13. The PE array shown in FIG. 14 preferably includes four light detectors 1410, four light-emitting diodes 1420 serving as light sources, and self-routing switching logic 1430 to which the light detectors and diodes are connected.

Although light-emitting diodes are shown in this implementaion as the light sources 1320 and 1420, any of the light source/light detector pairs described above for previous embodiments may be used.

The operation of the fourth embodiment will now be described with reference to FIG. 12. When a light a source 1320 on one of the plurality of PE arrays 1260 on the first planar surface 1210 is activated, the light travels along a first light path 1205 to the first plurality of lenses 1220. The first plurality of lenses 1220 collimates the light from the light source 1320 and passes it along a second light path to the second plurality of lenses 1230. A second lens from the second plurality of lenses 1230, focuses the collimated light beam 1215 across a third light path 1225 onto a light detector 1410 on one of the PE arrays 1270 on the second planar surface 1240. After appropriate switching, the signal is routed in the reverse direction when a light source 1420 on second surface is activated, passing light along a fourth light path 1235 to a lens from the second plurality of lenses 1230. The lens from the second plurality of lenses 1230 collimates the light source and passes it along a fifth light path 1245 to a lens from the first plurality of lenses 1220. The lens from the first plurality of lenses 1220 focuses the collimated beam onto a light detector on one of the arrays on the first planar surfaces along a sixth light path 1255. In addition to the switching logic of the previous embodiments, the 2 plane embodiment includes the ability for a failed signal to pass one stage before beginning its rerouting so as to end its $Log_k N$ successful stages on the first plane where removal is possible.

Although in this embodiment, the light sources, detectors, and first and second plurality of lenses 1220 and 1230 are chosen and positioned to provide a four shuffle between light sources and detectors, other k-shuffles are possible. By varying the properties and positions of the first and second plurality of lenses 1220 and 1230, and varying the positions of the light sources and detectors on the first and second planar surfaces 1210 and 1240, different connection schemes can be obtained.

Figure 15:
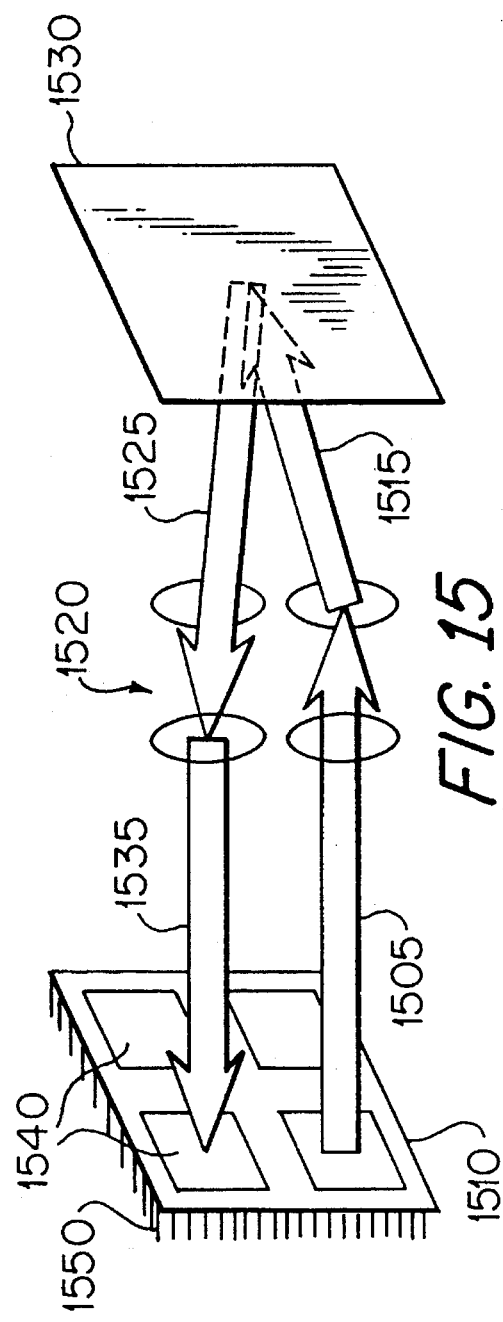
FIG. 15 is a perspective view of an implementation of another embodiment of a sliding banyan network constructed in accordance with the present invention.

A further embodiment of the sliding banyan network of the present invention is shown in FIG. 15, and includes a single planar surface 1510, the plurality of lenses 1520, and a mirror 1530. The planar surface 1510 includes a plurality of processing element (PE) arrays 1540, each PE array being on a single integrated circuit (IC) and being connected to an input and an output pin chosen from a plurality of input and output pins 1550. The fifth embodiment of FIG. 15 operates in the same manner as the embodiment of FIG. 12 except that a single planar surface contains all of the PE arrays. The mirror 1530, by reflecting the images from the light source on the front surface of planar array 1510 back to the light detector on this same front surface, allows the lens array 1520 to perform as the first and second lens arrays and the surface 1510 as the first and second planar surfaces in the embodiment of FIG. 12.

The PE arrays 1540 are preferably identical to the first PE arrays 1250 shown in FIGS. 12 and 13. Because all of the PE arrays are contained on a single planar surface, there are twice the number of PE's on the planar surface as on either of the first or second planar surfaces in FIG. 12 for the same switching capacity.

The operation of FIG. 15 will now be described. When a light source on one of the plurality of PE arrays 1540 on the planar surface 1510 is activated it passes light along a first light path 1505 to a lens in the plurality of lenses 1520. The lens in the plurality of lenses 1520 collimates the light source and passes the collimnates light along a second light path 1515 to the mirror 1530 which reflects this collimated beam to a second lens in lenses 1520 along a third light path 1525. This second lens, which may be the same or different from the first lens, focuses the collimated beam on a light detector on one of the PE arrays 1540 on the planar surface 1510 along a fourth light path 1555.

Although in this embodiment, the light sources, detectors, and plurality of lenses 1520 are chosen and positioned to provide a 4-shuffle between light sources and detectors, other k-shuffles are possible. By varying the properties and positions of the plurality of lenses 1520, and by varying the positions of the light sources and detectors on the planar surface 1510, different k-shuffles can be obtained.

In the PE arrays in the embodiment of the invention, as described above, the light sources are preferably light-emitting diodes (LEDs), the light detectors are preferably photoconducting optical detectors, and the switches and switching logic are preferably implemented with FETs. All three of these devices are created on the same GaAs integrated circuit. Furthermore, the plurality of PE arrays are created by an integrated fabrication process to ensure accurate placement of the devices interacted on the IC. APE array of the type employed by this invention can be made according to the process described in *Design, Fabrication and Performance of an Integrated Optoelectronic Cellular Array*, M. Hibbs-Brenner et al., SPIE Proceedings on Optical Enhancements to Computing Technology, Jul. 22–23, 1991, San Diego, or can be obtained by Honeywell, Inc.

As an alternative, each integrated circuit for the PE arrays may comprise a plurality of vertical-cavity surface-emitting lasers (VCSELs) and detectors for data transfer, and integrated or hybrid electronics (several hundred gates) for data switching. The VCSELs may be mounted either on the face of the IC or on its backplane. PE arrays including VCSELs are discussed in The Summer Topical Reading Digest on "Smart Pixels," a symposium held at Lake Tahoe, Nev., Jul. 11–13, 1994.

In this alternate embodiment, for a 1024 node switch, consisting of 30 stages, there are over 30,000 VCSEL/ detector pairs distributed across the backplane. The power consumption for this embodiment is approximately 10 mW/optical link, which accounts for the majority of power used by the smart pixel.

Given a maximum power dissipation on a chip of 2 $W/cm^2$ the maximum smart pixel density is 200 $/cm^2$. The sliding banyan architecture consisting of 30,000 optical links thus requires about 150 cm of optoelectronic integrated circuit (OEIC) chip area. A backplane of 20 cm×20 cm has an OEIC fill factor of about 40%.

Other alternate embodiments may employ different light sources, as, for example, those disclosed in *Free-space Photonic Switching Architectures Based On Extended Generalized Shuffle Networks*, by Thomas J. Cloonan et al, Applied Optics, Vol. 32, No. 35, Dec. 10, 1992, pp. 7471–7492. The light detectors in these embodiments are chosen to be compatible with the light sources used.

Although each of the embodiments described uses a pipelined operation, in alternate embodiments nonpipelined operations may be used. For nonpipelined operation, only one source and one detector for each PE will be needed. The complexity of the electronic exchange-bypass configuration are determined by the choice of the 2-D shuffle type. Either a self-routing network or a circuit-switched network may be used if the multistage latency for each is acceptable. Each PE in a time multiplexed operation requires local intermediate storage to hold data segments as they pass through each stage of the network. Each PE also requires appropriate optoelectronic interface circuitry, such as multiplexers, demultiplexers, and amplifiers, as well as decoding circuitry used in time multiplexed operation for the routing address. If a self-routing scheme is not employed, the decoding circuitry is not needed.

A sliding banyan network, as shown in FIG. 4, has an output link at each stage for the immediate removal of packets which have reached their destination. This immediate removal provides a significant reduction in the number of stages required for a given blocking rate. FIG. 4 shows the number of output drivers required for an unfolded deflection routing scheme to be $N(M-\log_k N)$, where M is the number of stages, k is the shuffle order, i.e., the size of the switch used in the stages, and N is the number of nodes, i.e., inputs lines and output lines, in each stage. By implementing the sliding banyan network shown in FIG. 4 in a single plane with all of the switches for a given node on a single IC, the number of output drivers for data removal is reduced to N.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, modifications may be made to adapt a particular element, technique or implementation to the teachings of the present invention without departing from the scope of the invention. Therefore, it is intended that this invention not be limited to the particular embodiments and methods disclosed herein, but that the invention include all embodiments falling with the scope of the appended claims.

What is claimed is:

1. A sliding banyan switch for optoelectronically switching signals based on destination data contained in the signals, comprising:

N signal input lines for receiving N signals;

N signal output lines for transmitting the N signals;

N coplanar processing element arrays, each processing element array being on a single substrate and being connected to one of the N signal input lines and one of the N signal output lines, each processing element array having a plurality of light sources and light detectors and self-routing switching logic connected to said light detectors and input lines, the self-routing switching logic accepting a first signal from the N signal input lines or the plurality of detectors and designating that the first signal be routed to one of the plurality of light sources based on decoding of the destination data in the first signal;

at least one mirror spaced from the coplanar processing element arrays so that light images from the light sources of the coplanar processing element arrays are passed along a light path back toward the coplanar processing arrays;

a plurality of shuffling lenses positioned in the light path for manipulating the images from the light sources of the coplanar processing arrays such that each of the plurality of light sources from the coplanar processing element arrays is imaged onto a separate individual one of the plurality of light detectors on the coplanar processing element arrays;

means for resolving conflicts between first signals designated to be routed to the same light source by designating one signal as successful and routing it to the designated light source, and designating the other signal as failed and routing the other signal to an alternate light source;

means for counting the number of consecutive successful routings for each signal;

means for deciding when the number of consecutive successful routings for a signal reaches a predetermined number; and means for routing the successful signal to the signal output line connected to the processing element array where the successful signal was located when the determining means determines that the current number of successful routings reaches the predetermined number.

2. A sliding banyan switch as in claim 1, wherein the N light sources comprise light emitters.

3. A sliding banyan switch as in claim 2, wherein the light emitters comprise vertical-cavity surface-emitting laser diodes.

4. A sliding banyan switch as in claim 2, wherein the light emitters comprise light-emitting diodes.

5. A sliding banyan switch as in claim 1, wherein the N light sources comprise light modulators.

6. A sliding banyan switch as in claim 1, wherein the means for resolving conflicts always designates as successful a signal having the then largest number of consecutive successful signal routings.

7. A sliding banyan switch as in claim 1, wherein the self-routing switching logic in each processing element array comprises $(\log_2 N)$ self-routing logic portions, each self-routing logic portion comprising a 2×2 switch accepting signals from two of the plurality of light detectors and providing signals to two of the plurality of light sources, and decoding and comparison logic connected to two of the plurality of light detectors and the 2×2 switch for decoding destination data from a detected signal and controlling the operation of the 2×2 switch based on the destination data.

8. A sliding banyan switch as in claim 1, wherein the destination data is designed to include bits constituting a destination address, and the self-routing switching logic designates each of the signals received from the plurality of detectors as signals to be output from one of the light sources based on a bit in the destination address.

9. A sliding banyan switch as in claim 1, wherein the predetermined number is $\log_k N$, where k is a shuffle order of the network.

10. A sliding banyan switch as in claim 1, wherein the plurality of light detectors is on the back side of the substrate, the plurality of light sources is on the front side of the substrate, said at least one mirror comprises a plurality of mirrors, and said plurality of mirrors focus the light path from the front side of the substrate onto the back side of the substrate.

11. A sliding banyan switch as in claim 1, wherein the placement of the plurality of lenses and the light sources and light detectors are chosen to route the signals according to a 2-shuffle interconnection scheme.

12. A sliding banyan switch as in claim 11, wherein the 2-shuffle interconnection scheme is a perfect shuffle.

13. A sliding banyan switch as in claim 1, wherein the placement of the plurality of lenses and the light sources and light detectors are chosen to route the signals according to a 4-shuffle interconnection scheme.

14. A sliding banyan switch for optoelectronically switching signals based on a destination address, comprising:

N signal input lines for receiving N signals;

N signal output lines for transmitting the N signals;

N coplanar first processing element arrays, each first processing element array being on a single substrate and being connected to one of the N signal input lines and one of the N signal output lines, each first processing element array having a plurality of light sources and light detectors and first switching logic connected to said light detectors and input lines, the first switching logic accepting a first signal from the N signal input lines or one of the plurality of detectors and designating that the first signal be routed to one of the plurality of light sources based on decoding of the destination data in the first signal;

N coplanar second processing element arrays spaced from the first coplanar processing arrays so that light from the light sources of the first coplanar processing element arrays is passed along a light path toward the second coplanar processing array, and light from the light sources of the second coplanar processing element arrays is passed along the light path toward the first coplanar processing array, each second processing element array being on a single substrate and having a plurality of light sources, light detectors, and second switching logic connected to said light detectors, the second switching logic accepting a first signal from one of the plurality of detectors and designating that the first signal be routed to one of the plurality of light sources based on decoding of the destination data in the first signal;

a first and second plurality of lenses positioned in the light path for manipulating the images from the light sources of the first and second coplanar processing element arrays such that each of the plurality of light sources from the first coplanar processing element arrays is imaged onto an individual one of the plurality of light detectors on the second coplanar processing element arrays, and each of the plurality of light sources from the second coplanar processing element arrays is imaged onto an individual one of the plurality of light detectors on the first coplanar processing element arrays;

means in the first and second switching logic for resolving conflicts between first signals designated to be routed to the same light source by designating one signal as successful and successfully routing it to the designated light source, and designating the other signal as failed and routing the other signal to an alternate light source;

means in the first and second switching logic for counting the number of consecutive successful routings for each signal;

means in the first and second switching logic for deciding when the number of consecutive successful routings for a signal is greater than or equal to a predetermined number; and means in the first switching logic for routing the successful signal to the signal output line corresponding to the processing element the successful signal was sent to when the determining means determines that the current number of successful routings is greater than of equal to the predetermined number.

15. A sliding banyan switching method for signal switching in a broadband network, including the steps of:

receiving N signals in N input positions in a stage, each signal having associated destination data, the destination data including a destination address and a routing count;

determining the routing of the N signals received in the N input positions based on decoding of the destination data;

detecting whether any two of the N signals are to be routed to the identical first output position in the stage and therefore will collide;

assigning one of the two colliding signals as a successful signal and the other of the two colliding signals as a failed signal if a potential collision is detected;

sending the successful signal to the first output position and sending the failed signal to a second output position in the stage;

incrementing the routing count for each successful signal to reflect a successful routing and setting the routing count for each failed signal to the original count;

recognizing as completely routed any signal having a routing count equal to a predetermined value, and outputting the completely routed signal from its current output position toward its destination;

transmitting all signals with a routing count not equal to the predetermined value to input positions in the next stage corresponding to respective output positions in the current stage; and repeating the process for all transmitted signals received at the next stage until all of the N signals are outputted.

16. A sliding banyan switching method as in claim 15, wherein the step of assigning one of the two colliding signals as a successful signal and the other of the two colliding signals as a failing signal sets as successful a signal having the larger value in the counter.

17. A sliding banyan switching method as in claim 15, wherein the determining step determines the routing of the N signals received in the N input positions based on the bit position in the destination address corresponding to count.

18. A sliding banyan switching method as in claim 15, wherein the determining step determines the routing of the N signals according to a 2-shuffle interconnection scheme.

19. A sliding banyan switching method as in claim 18, wherein the 2-shuffle interconnection scheme is a perfect shuffle.

20. A sliding banyan switching method as in claim 15, wherein the determining step determines the routing of the N signals according to a 4-shuffle interconnection scheme.

21. In an optoelectronic switch for routing telecommunication signals from input lines to output lines based on destination data contained in the signals, a banyan network comprising:

a plurality of coplanar processing element arrays forming multiple stages of the banyan network, each processing element array being formed on a single substrate to provide a plurality of substrates distributed laterally in the same physical plane, the multiple stages of the banyan network being physically interleaved in said plurality of substrates in said plane, each coplanar processing element array having a plurality of light sources and a plurality of light detectors for respectively transmitting light images from and receiving light images at said coplanar processing element arrays during routing of said telecommunication signals through the multiple stages of said banyan network, said light images forming light paths between said multiple stages;

at least one mirror spaced from said plane in said light paths so that light images from said light sources are reflected from said mirror;

a plurality of shuffling lenses positioned in the light paths for manipulating the light images such that the light images from the light sources in the coplanar processing element arrays in said plane are imaged via said mirror and shuffling lenses onto said light detectors in the coplanar processing element arrays in said plane as said telecommunication signals are routed from said input lines through said multiple stages to said output lines in accordance with said destination data.

22. A sliding banyan switch for optoelectronically switching signals based on destination data contained in the signals and control signals external to the switch, comprising:

N signal input lines for receiving N signals;

N signal output lines for transmitting the N signals;

N coplanar processing element arrays, each processing element array being on a single substrate and being connected to one of the N signal input lines and one of the N signal output lines, each processing element array having a plurality of light sources and light detectors and a switch connected to said light detectors and input lines, the switch accepting a first signal from the N signal input lines or the plurality of detectors and routing the first signal to one of the plurality of light sources or one of the N signal output lines, based on the external control signals;

at least one mirror spaced from the coplanar processing element arrays so that light images from the light sources of the coplanar processing element arrays are passed along a light path back toward the coplanar processing arrays; and a plurality of shuffling lenses positioned in the light path for manipulating the images from the light sources of the coplanar processing arrays such that each of the plurality of light sources from the coplanar processing element arrays is imaged onto a separate individual one of the plurality of light detectors on the coplanar processing element arrays.

23. A sliding banyan interconnection network for routing telecommunication signals from input lines through multiple stages to output lines based on destination data contained in said signals, the destination data for a signal including destination address bits and success bits identifying the number of stages through which a signal has been successfully routed, said sliding banyan interconnection network including a series of overlapping banyan networks and comprising:

a plurality of processing elements forming each of said multiple stages, each processing element having at least two light sources and at least two light detectors for respectively transmitting light images from and receiving light images at said processing elements during routing of said telecommunication signals through the multiple stages of said sliding banyan network, said light images forming light paths between said multiple stages;

a plurality of shuffling lenses positioned in the light paths for manipulating the light images such that the light images from the light sources in the processing elements in one of said multiple stages are imaged via said shuffling lenses onto said light detectors in the processing elements in the next one of said multiple stages;

means in each of said processing elements for detecting a conflict when a plurality of signals are designated by their respective destination bits to be routed to the same designated light source, including means for comparing respective success bits in the plurality of signals and routing the winning signal with the greatest number of successful routings to said designated light source and routing the losing signal with the smaller number of successful routings to an alternate light source for transmission to the next one of said multiple stages, said next one of said multiple stages constituting the first stage of one of said overlapping banyan networks in which the losing signal can immediately begin its routing anew in the processing element in which it was received.

\* \* \* \* \*